(12) United States Patent
Kuboth

(10) Patent No.: US 7,264,736 B2
(45) Date of Patent: Sep. 4, 2007

(54) REMOVAL OF NON-WATER SOLUBLE SUBSTANCES FROM SOLUTIONS OF AQUEOUS METAL EXTRACTS

(75) Inventor: Detlef Kuboth, Duesseldorf (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/495,665

(22) Filed: Jul. 31, 2006

(65) Prior Publication Data

US 2007/0003462 A1 Jan. 4, 2007

Related U.S. Application Data

(63) Continuation of application No. 10/475,264, filed as application No. PCT/EP02/03869 on Apr. 6, 2002, now abandoned.

(30) Foreign Application Priority Data

Apr. 20, 2001 (DE) .................... 101 19 685

(51) Int. Cl.
*B01D 43/00* (2006.01)
*C02F 1/68* (2006.01)

(52) U.S. Cl. ............ 210/728; 210/908; 210/634; 210/638; 210/734; 210/735

(58) Field of Classification Search ........ 423/130, 423/121, 82, 610, 615, 616, 625; 210/908, 210/634, 638, 728, 734, 735; 422/129
See application file for complete search history.

(56) References Cited

U.S. PATENT DOCUMENTS

| | | |
|---|---|---|
| 3,661,868 A | 5/1972 | Barron |
| 3,962,332 A | 6/1976 | Trapasso |
| 4,514,551 A | 4/1985 | Furuno et al. |
| 4,578,255 A | 3/1986 | Roe et al. |
| 4,597,952 A | 7/1986 | Fabre et al. |
| 4,789,485 A | 12/1988 | Field et al. |
| 4,902,425 A | 2/1990 | Keeney |
| 4,986,742 A | 1/1991 | Denecker et al. |
| 5,073,272 A | 12/1991 | O'Neill et al. |
| 5,133,874 A | 7/1992 | Spitzer et al. |
| 5,284,634 A | 2/1994 | Strominger et al. |
| 5,427,750 A | 6/1995 | Sommese et al. |
| 5,512,646 A | 4/1996 | Hartan et al. |
| 6,228,964 B1 | 5/2001 | Hartan et al. |

FOREIGN PATENT DOCUMENTS

| | | |
|---|---|---|
| DE | 25 02 247 | 7/1975 |
| EP | 0 070 425 | 6/1982 |
| EP | 0 228 637 | 7/1987 |
| EP | 0 256 312 | 3/1992 |
| GB | 2 112 005 | 7/1983 |

*Primary Examiner*—Timothy C. Vanoy
(74) *Attorney, Agent, or Firm*—Oblon, Spivak, McClelland, Maier & Neustadt, P.C.

(57) ABSTRACT

The invention relates to methods and a device for the removal of non-water soluble substances from solutions of aqueous metal extracts, by addition of at least one water-soluble cationic polyelectrolyte, containing a diallylaminoalkyl(meth)acrylamide, neutralized or quaternised with mineral acid and subsequently polymerized, preferably dimethylaminopropylacrylamide.

11 Claims, No Drawings

REMOVAL OF NON-WATER SOLUBLE SUBSTANCES FROM SOLUTIONS OF AQUEOUS METAL EXTRACTS

The present invention relates to a process and an apparatus for removing water-insoluble substances from solutions of aqueous metal extracts by addition of water-soluble cationic polyelectrolytes which comprise dimethylaminopropylacrylamides which have been neutralized or quaternized by mineral acids and subsequently polymerized.

Some metals and metal compounds are won from natural raw materials via aqueous extracts. For example, aluminum is obtained from aluminum oxide which is prepared worldwide from bauxite by the process of Karl Joseph Bayer. For this purpose, milled bauxite is digested with a hot aqueous sodium hydroxide solution and the aluminum is converted into sodium aluminate which is soluble in the digestion solution at high temperatures and precipitates when the temperature is lowered.

In the case of aqueous extracts of natural raw materials, both soluble and also dispersed and colloidal water-insoluble impurities in the raw materials go over into the aqueous phase.

Problems are posed especially in the precipitation of metal compounds by the water-insoluble impurities, in particular the water-insoluble organic impurities, for example humins, red mud and oxalates, which are present in colloidal or dispersed form in the digestion solution. These water-insoluble impurities hinder the precipitation of the metal compounds from the digestion solutions and contaminate the precipitation products. In addition, these water-insoluble impurities accumulate in digestion solutions which are reused in such processes.

U.S. Pat. No. 4,578,255 describes a process for reducing the concentration of water-insoluble humic acid-like impurities from digestion solutions of the Bayer process by partial precipitation of these impurities by means of water-soluble polymeric quaternary ammonium salts, in particular by means of homopolymers of diallyldimethylammonium chloride monomers.

Only the homopolymers of polydiallyldimethylammonium chloride make it possible to achieve an industrially acceptable reduction in the concentration of the humic acids, while other polymeric quaternary ammonium salts and heterogeneous copolymers, for example, those of diallyldimethylammonium chloride and acrylamide, give considerably poorer results. The preparation of these compounds is comparatively difficult. In addition, these polymers are not available as solids. Further-more, the efficiency of these polymer products is still low.

It is an object of the present invention to provide a process which does not have the disadvantages of the prior art.

This object is achieved by a process for removing water-insoluble substances from solutions of aqueous metal extracts by addition of at least one water-soluble cationic polyelectrolyte which comprises at least 50 mol % of diallylaminoalkyl(meth)acrylamide, preferably dimethylaminopropylacrylamide, which has been neutralized or quaternized by at least one mineral acid and subsequently polymerized, based on the total amount of the polyelectrolyte.

The cationic polyelectrolyte preferably comprises at least 70 mol %, particularly preferably at least 90 mol %, of diallylaminoalkyl(meth)acrylamide, preferably dimethylaminopropylacrylamide, which has been neutralized or quaternized by means of mineral acid and subsequently polymerized, based on the total amount of the polyelectrolyte.

The cationic polyelectrolyte is very particularly preferably a homopolymer of diallylaminoalkyl(meth)acrylamide, preferably dimethylaminopropylacrylamide, which has been neutralized or quaternized by means of mineral acid and subsequently polymerized.

Preference is also given to copolymers of acrylamide and diallylaminoalkyl(meth)acrylamide, preferably dimethylaminopropylacrylamide, which has been neutralized or quaternized by means of mineral acid and subsequently polymerized.

Very particular preference is given to copolymers in which the quotient of limiting viscosity of the copolymer and the molar ratio of acrylamide to dimethylaminopropylacrylamide is at least 200 ml/g.

Preferred copolymers of acrylamide and dimethylaminopropylacrylamide which can be used in the process of the invention are described, for example, in EP 0 228 637 B1 for dewatering wastewater treatment sludges. In respect of the preparation of copolymers of acrylamide (ACA) and dimethylaminopropylacrylamide (DMAPAA), pages 3 and 10 of EP 0 228 637 B1 are hereby expressly incorporated by reference as part of the present disclosure.

The homopolymers and the copolymers can be prepared by known polymerization methods.

The preparation of copolymers of ACA and DMAPAA which has been neutralized or quaternized by mineral acids will be described by way of example below.

The purity of the DMAPAA is important for achieving a quotient of limiting viscosity and molar ratio of ACA and DMAPAA of at least 200 ml/g. For both the preparation of the homopolymers and that of copolymers, DMAPAA should be essentially free of bifunctional compounds, i.e. they may be present in only a very small proportion in the DMAPAA. Bifunctional compounds cause crosslinking in the polymer and thus lead to the formation of water-insoluble constituents which impair the product effectiveness in use. The degree of crosslinking therefore has to be kept sufficiently low for the water solubility of the polymerization products not to be significantly impaired. It has to be noted that, for example, N-allylacrylamide can be formed from DMAPAA by elimination of dimethylamine. To obtain copolymers having the abovementioned quotient, the amount of N-allylacrylamide should not exceed 30 ppm.

To carry out the copolymerization of DMPAA with ACA, the salt of the basic monomers with acids or the reaction product with quaternizing agents such as methyl chloride or dimethyl sulfate is formed first. An aqueous solution of the monomer which has been converted in this way into a cation together with a proportion of acrylamide is subsequently prepared and polymerized by free-radical polymerization. The polymerization can be initiated by redox systems, for example the system sodium bisulfite/potassium peroxodisulfate, by initiators which decompose thermally, for example, azobisisobutyronitrile, or by photochemically generated radicals, for example from the isopropyl ether of benzoin.

Depending on the water content, the polymerization gives a highly viscous solution, a rubber-like gel or a brittle solid. Reduction of the water content to 5-15% and comminution makes it possible to obtain a copolymer product in powder form having particle sizes of from 0.1 to 1 mm.

The preparation of dimethylaminopropylacrylamide (DMAPAA) can be carried out, for example, as described in DE 25 02 247 A or EP 0 070 425 A by reaction of one mole of acrylic acid or acrylamide with 2 mol of dimethylaminopropylamine and subsequent pyrolysis.

The polyelectrolytes which can be used in a process according to the invention preferably have a degree of polymerization of at least 90%, particularly preferably at least 95% and very particularly preferably at least 98%. A degree of polymerization of 100% is most preferred.

The polyelectrolytes to be used according to the invention preferably have, at a proportion of 40% by weight of polyelectrolyte and 60% by weight of water, based on the total mass, a viscosity of from 1000 to 14 000 mpa*s, particularly preferably a viscosity of from 4000 to 8000 mpa*s, to be determined by the Brookfield method at 20° C. using a Spindle IV.

The polyelectrolytes which can be used in the process of the invention can be prepared, transported and used in the process of the invention either as liquids or as water-in-water dispersions or as granulated materials. Water-in-water dispersions make it possible for the polyelectrolytes to be dissolved in aqueous solutions quickly without formation of lumps. Polyelectrolytes in granulated form are easy to handle and to transport. Before use in aqueous digestion solutions, granulated materials are preferably prediluted or converted into dispersions.

In a preferred embodiment, the polyelectrolyte is used in the process of the invention in a final concentration of the polyelectrolyte of from 1 to 500 ppm, particularly preferably from 2 to 250 ppm and very particularly preferably from 5 to 50 ppm, based on the digestion solution.

The polyelectrolytes described are highly heat resistant even in caustic solutions and are preferably used in digestions solutions at elevated temperatures, particularly preferably at temperatures of from 80 to 110° C.

In a preferred embodiment, the process of the invention is applied to aqueous solutions which are formed in metal extraction for preparing titanium dioxide, particularly preferably to aqueous solutions which are obtained in the "sulfate" process for producing titanium dioxide.

In the sulfate process, a slag obtainable from ilmenite ($FeTiO_3$) by reduction with coke is treated with concentrated sulfuric acid at 100-180° C. and the digestion cake obtained in this way is dissolved in hot water or sodium hydroxide solution, with or without addition of iron for reducing trivalent iron, resulting in precipitation of hydrated titanium dioxide which is calcined in a rotary tube furnace at from 800 to 1000° C. to form finely particulate anatase or at >1000° C. to form coarsely particulate rutile or at from 800 to 1000° C. in the presence of rutile nuclei to form finely particulate rutile.

The cationic polyelectrolyte used in the process of the invention forms both organic and inorganic colloidal and dispersed water-insoluble solids.

In a further, preferred embodiment, the process of the invention is applied to aqueous solutions which are used in metal extraction for preparing aluminum oxide, preferably by the Bayer process.

In the Bayer process, bauxite is milled and the aluminum is dissolved in hot aqueous sodium hydroxide solution as soluble sodium tetrahydroxyaluminate. Most of the other constituents of the bauxite are insoluble in the alkaline digestion solution.

The hot digestion solution is then cooled somewhat and the larger insoluble particles are separated off in a coarse filter, usually a sand filter. The coarse filter is generally followed by a further fine filter which removes very fine insoluble particles from the solution. The coarse and fine filters are washed with water at regular intervals or continuously to free them of deposits.

After the insoluble constituents have been separated off in the filters, the aluminate solution is cooled to such an extent that aluminate hydroxide precipitates. The aluminum hydroxide which has been precipitated in this way is then classified, i.e. large solid particles are separated off and finer solids, usually those having a diameter of <45 μm, are reused as seed crystals for further precipitation. The coarse fraction of the aluminum hydroxide precipitation is washed with water and converted into aluminum oxide by calcination. In industrial processes, the remaining digestion solution is then heated again and, if appropriate, concentrated by evaporation and/or further sodium hydroxide is added and/or impurities are removed from the solution.

Depending on their origin, the bauxite raw materials contain from 0.01 to 0.25% of carbon. During the digestion, most of these carbon compounds are converted into humins, oxalates and carbonates. Some of these substances, for example the humins and oxalates, are present in water-insoluble form as dispersed solid particles and/or colloids which cannot be separated off by conventional filtration methods.

These and other water-insoluble organic and/or inorganic impurities in the aluminuate-containing digestion solution have an adverse influence on the effectiveness and rate of the precipitation of aluminum hydroxide. Charged impurities such as humins can be removed from the digestion solution by means of cationic polyelectrolytes prior to the precipitation step.

The Bayer process therefore preferably comprises at least the following steps:
 a) a digestion of milled bauxite with hot aqueous sodium hydroxide
 b) the coarse separation of solids by filtration, preferably by means of a sand filter,
 c) the fine separation of solids,
 d) the precipitation of hydroxyaluminate from the digestion solution by means of cooling.

The cationic polyelectrolytes to be used according to the invention can be introduced into the digestion solution at a plurality of points between step a) and step d), but have to be added at least before the final filtration step prior to the aluminum hydroxide precipitation.

The above-described cationic polyelectrolyte is preferably added before and/or after the coarse separation of step b), with the cationic polyelectrolyte preferably being introduced into the washing water used in the coarse separation.

The clear mother liquor from the separation of step d) is preferably at least partly worked up by purification and/or addition of sodium carbonate and/or concentration by evaporation and/or heating and at least partly reused for the digestion of step a). In this case, the cationic polyelectrolyte can also be solely or additionally introduced into the process during the work-up.

In addition to the cationic polyelectrolyte, at least one anionic electrolyte can advantageously also be added to the digestion solution. Particular preference is given to anionic electrolytes based on acrylamide and acrylic acid, as are described, for example, in EP 0 256 312 B1, which is hereby incorporated by reference into the present disclosure.

The anionic electrolytes can be added to the digestion solution in the same process step as the cationic polyelectrolytes or in a subsequent process step. However, it should be ensured that the cationic polyelectrolyte is added first and has sufficient time to interact with the organic impurities before the anionic polyelectrolyte is added.

Preference is given to using an anionic polyelectrolyte which comprises
a) from 90 to 30% by weight of acrylic acid and/or methacrylic acid,
b) from 10 to 60% by weight of a compound of the formula

where $R_1$ is hydrogen or a methyl radical, $R_2$ and $R_3$ may be identical or different and are each a methyl or ethyl radical and X is a branched or unbranched alkylene radical having from 1 to 5 carbon atoms,
c) if necessary, from 0 to 50% by weight of acrylamidomethylpropanesulfonic acid,
d) from 0 to 10% by weight of another ethylenically unsaturated compound in copolymerized form, and whose molecular weight measured at a pH of 8.0 is less than 100,000.

Such compounds are described as dispersants in EP 0 256 312 B1.

The anionic polyelectrolytes are obtained by polymerization methods known per se. The polymerization of the monomers is preferably carried out in aqueous solution or in mixtures of water and water-miscible solvents such as alcohols, for example isopropanol. The initiation of the polymerization can be effected in a manner analogous to the initiation described for the cationic polymers.

The anionic polyelectrolytes which can be used in a process according to the invention preferably have a molecular weight of from 500 to 50 000, determined by gel permeation chromatography, and/or preferably have a degree of polymerization of at least 90%, particularly preferably at least 95% and very particularly preferably at least 98%. A degree of polymerization of 100% is most preferred.

In a preferred embodiment of the present invention, the clear mother liquor from the filtration step into which the anionic polyelectrolyte has been introduced has further cationic polyelectrolyte introduced into it.

Since the proportion of organic impurities in bauxite raw materials of differing origin varies greatly, the polyelectrolytes are preferably introduced as a function of the proportion of humic acid in the digestion solution as regulating parameters.

Both the cationic polyelectrolyte and/or the anionic polyelectrolyte can be added a number of times in various steps of the Bayer process.

A further aspect of the present invention is an apparatus for carrying out the Bayer process for the preparation of aluminum oxide from bauxite, which comprises at least one digestion vessel, a solids separation and a precipitation vessel or a filtration apparatus and has an addition point for at least one cationic polyelectrolyte comprising at least a proportion of 50 mol % of diallylaminoalkyl(meth)acrylamide, preferably dimethylaminopropylacrylamide, which has been neutralized or quaternized by means of mineral acid and subsequently polymerized, based on the total amount of the polyelectrolyte.

This addition point is preferably configured as a filling port for aqueous solutions or dispersions or as a mixing chamber with access to the digestion solution. The addition point can be located on any apparatus for carrying out the Bayer process which is located before the final separation of solids prior to the precipitation step.

The invention is illustrated below by means of an example. This example serves merely to illustrate the invention and does not restrict the general scope of the invention.

EXAMPLE

Precipitation of Water-Insoluble Impurities

A bauxite mixture of 60% by weight of Weipa A bauxite and 40% of Boke bauxite having a carbon content of about 2.0% was subjected to the Bayer digestion process on a pilot plant scale.

A 1% strength by weight aqueous cationic homopolymer solution prepared from quaternized and subsequently polymerized dimethylaminopropylacrylamides was added to the alkaline digestion solution to bring it to a final concentration of 40 ppm of cationic polymer and the mixture was stirred for 3 minutes. Homopolyelectrolytes having viscosities of 1500, 3900 and 6450 mpas*s determined on a 40% strength by weight aqueous solution, based on the total amount, at 20° by the Brook method using a Spindel type IV at 10 rpm were used. The final volume of the digestion solution was 1000 ml in a measuring cylinder. After a further settling time of 5 minutes, the turbidity of a sample of the clear supernatant liquid was measured at a wavelength of 691 nm by means of a Philipps PU 8620 spectral photometer.

While control batches without cationic polymers displayed no influence on the turbidity of the supernatant liquid from the digestion, all cationic polyelectrolytes having the abovementioned viscosities produced a significant reduction in the turbidity of the supernatant liquid examined.

The invention claimed is:

1. A process for removing a water-insoluble substance from a solution containing an aqueous metal extract comprising:
adding at least one water-soluble cationic polyelectrolyte to a solution containing an aqueous metal extract,
wherein the aqueous metal extract is an extract for the preparation of titanium dioxide, and
wherein said polyelectrolyte comprises at least 50 mol % of dialkylaminoalkyl(meth)acrylamide, which has been neutralized or quaternized by at least one mineral acid and subsequently polymerized, based on the total amount of the polyelectrolyte.

2. The process of claim 1,
wherein the cationic polyelectrolyte comprises at least 70 mol % of dialkylaminoalkyl(meth)acrylamide which has been neutralized or quaternized by means of mineral acid and subsequently polymerized, based on the total amount of the polyelectrolyte.

3. The process of claim 1, wherein the cationic polyelectrolyte is at least one homopolymer of dialkylaminoalkyl (meth)acrylamide which has been neutralized or quaternized by at least one mineral acid and subsequently polymerized.

4. The process of claim 1, wherein the polyelectrolyte is at least one copolymer of acrylamide and dialkyl aminoalkyl (meth)acrylamide which has been neutralized or quaternized by at least one mineral acid and subsequently polymerized.

5. The process of claim 4 in which the quotient of limiting viscosity of the copolymer and the molar ratio of acrylamide to dimethyl-aminopropylacrylamide is at least 200 ml/g.

6. The process of claim 1, wherein the polyelectrolyte has a degree of polymerization of at least 90%.

7. The process of claim 1, wherein the polyelectrolyte has, at a proportion of 40% by weight of polyelectrolyte and 60% by weight of water, based on the total mass, a viscosity of from 1000 to 14 000 mPa*s determined by the Brookfield method at 20° C. using a Spindle IV.

8. The process of claim 1, wherein the polyelectrolyte is used as a liquid or as a water-in-water dispersion or as a granulated material.

9. The process of claim 1, wherein the final concentration of the polyelectrolyte ranges from 1 to 500 ppm based on the digestion solution.

10. The process of claim 1, wherein said solution is at a temperature ranging from 80 to 110° C.

11. The process of claim 1, wherein the cationic polyelectrolyte is added a plurality of times.

* * * * *